United States Patent
Bhayani et al.

[11] Patent Number: 5,633,687
[45] Date of Patent: May 27, 1997

[54] METHOD AND SYSTEM FOR PROVIDING AN INTERLACED IMAGE ON AN DISPLAY

[75] Inventors: Dhimant N. Bhayani, San Jose; Phani Chandrupatla, Sunnyvale, both of Calif.

[73] Assignee: C-Cube Microsystems, Milpitas, Calif.

[21] Appl. No.: 547,038

[22] Filed: Oct. 23, 1995

[51] Int. Cl.⁶ .............................. H04N 7/01; H04N 11/02
[52] U.S. Cl. ........................... 348/441; 348/451; 348/458
[58] Field of Search ...................................... 348/441, 448, 348/451, 458, 459, 607; H04N 7/01, 11/02

[56] References Cited

U.S. PATENT DOCUMENTS

| | | | |
|---|---|---|---|
| 4,602,273 | 7/1986 | Carlson | 358/11 |
| 4,633,294 | 12/1986 | Nadan | 358/11 |
| 5,029,001 | 7/1991 | Tanaka et al. | 358/140 |
| 5,115,301 | 5/1992 | Hurst, Jr. | 358/12 |
| 5,428,398 | 6/1995 | Faroudja | 358/452 |
| 5,465,119 | 11/1995 | Demos | 348/447 |

*Primary Examiner*—Glenton B. Burgess
*Attorney, Agent, or Firm*—Benman Collins & Sawyer

[57] ABSTRACT

A system and method for removing motion artifacts from an interlaced image is disclosed. The interlaced image comprises an odd and an even field. The system and method includes providing one of the odd and the even fields on every other line of the display and then providing a set of constant signal level lines to the remaining lines of the display. The method and system further includes shifting the location of the constant signal levels lines by a scan line responsive to a timing signal from the display, and providing the other of the odd and the even field to the display responsive to the shift.

26 Claims, 6 Drawing Sheets

METHOD AND SYSTEM FOR PROVIDING AN INTERLACED IMAGE ON AN DISPLAY

FIELD OF THE INVENTION

The present invention relates generally to displaying an image with interlaced fields on a noninterlaced display, and more particularly, for displaying such interlaced fields so as to substantially eliminate artifacts created thereby.

BACKGROUND OF THE INVENTION

Computers are being utilized extensively that have a video viewing capability. In most instances, as is well known, these video images are interlaced and the graphics displays associated with such computers are noninterlaced. It is also known that in such a noninterlaced computer, motion artifacts are created thereby that create ghosts or a trailing video image.

This occurs because an interlaced frame consists of two video fields that are separated in time domain by a vertical period. As each video field can be unique or there are moving objects or scenes, when these two fields are combined to form a single frame, the video picture appears to be tearing since the object has moved from one point to the next in the video frame between the fields. Traditionally, this artifact problem has been addressed either reproducing the second field by replication of each scan line on the video, by forcing every other line black, or interpolating lines of the same field to form a frame.

Accordingly, what is needed is a method and apparatus for minimizing this ghosting or tearing effect caused by the artifacts, but at the same time the system should be one that is simple and easy to implement in the existing computer system. In addition, this system should be applicable to any environment where there is interlaced image being displayed on a noninterlaced screen. The system should be such that it is easy to implement and can be easily produced in a cost effective manner.

SUMMARY OF THE INVENTION

A system and method for removing artifacts from an interlaced image is disclosed. The interlaced image comprises an odd and an even field. The system and method includes providing one of the odd and the even fields on every other line of the display and then providing a set of constant signal level lines to the remaining lines of the display. The method and system further includes shifting the location of the constant signal levels lines by a scan line responsive to a timing signal from the display, and providing the other of the odd and the even field to the display responsive to the shift.

The present invention in a preferred embodiment operates in the following manner. On each vertical sync of a graphics display, the location of video data and constant signal level line is shifted by one scan line to create the video frame as it is created on an interlaced display in a preferred embodiment. The picture brightness and chroma saturation are automatically increased to compensate for the low persistent phosphor on a fine pitch display.

This mechanism is usable for full screen interlaced video data display on a monitor for the display of interlaced video data in a freely scalable video window. Essentially, the system "converts" a computer monitor into "interlaced" computer monitor. What is even more unique is a small region, rectangular or arbitrary shape, can also be "converted" into "interlaced" display for displaying incoming interlaced video data on a monitor without the "tearing" artifact.

DETAILED DESCRIPTION

The present invention relates to an improvement in displaying interlaced frames on a noninterlaced display. The following description is presented to enable one of ordinary skill in the art to make and use the invention and is provided in the context of a patent application and its requirements. Various modifications to the preferred embodiment and the generic principles and features described herein will be readily apparent to those skilled in the art.

Figure 1:
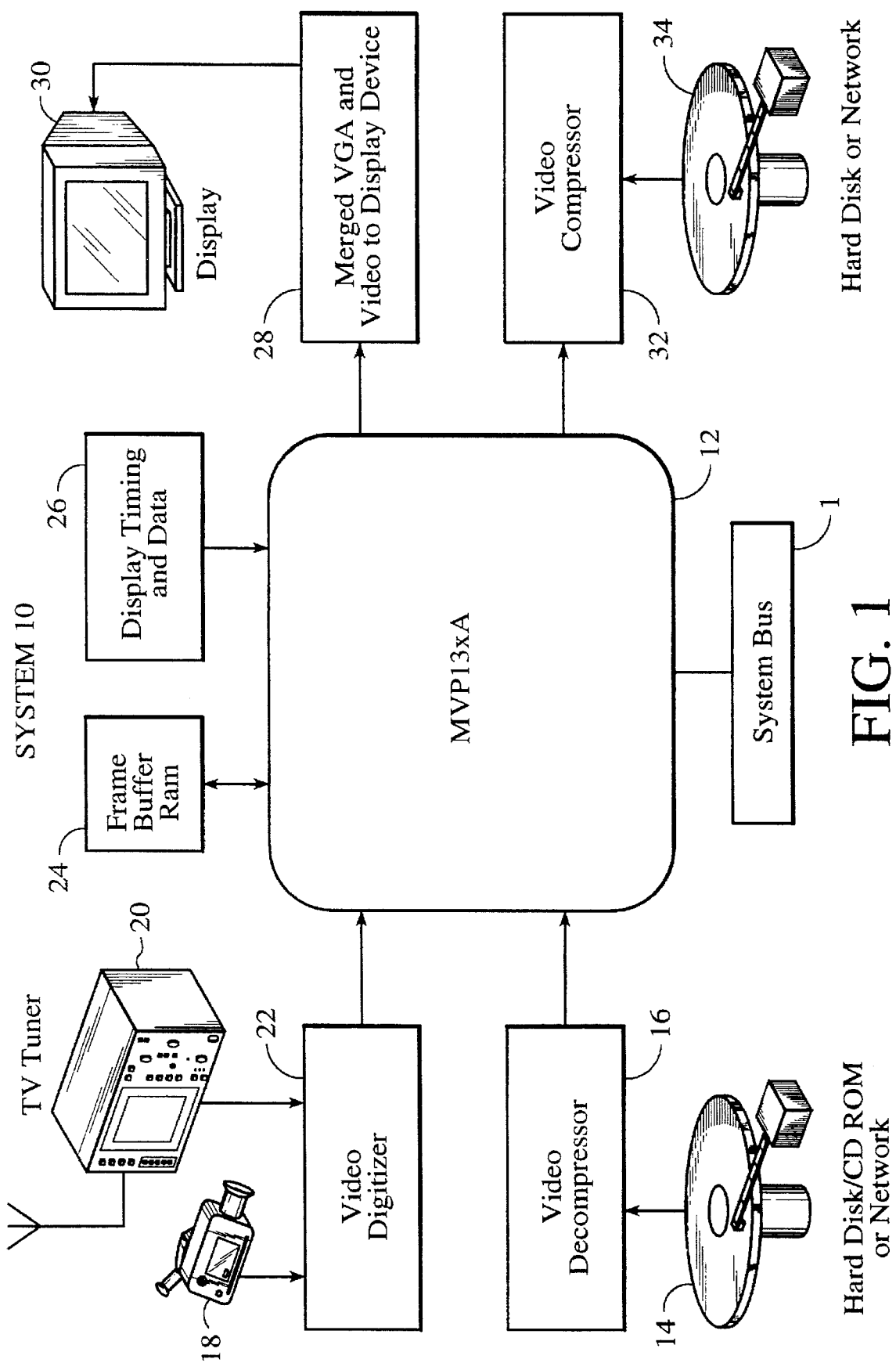
FIG. 1 is a block diagram of a system for providing an interlaced image on a noninterlaced display.

FIG. 1 is a block diagram of a system 10 for providing an interlaced image on a noninterlaced display. The system 10 comprises a video processor 12 which can receive video signals either from a hard disk, CD-ROM 14 via a video decompressor 16 or from a video camera 18 or TV tuner 20 via a video digitizer 22. The processor 12 in turn accesses information in a frame buffer memory 24 responsive to display and timing data device 26. A merged video and VGA device 28 then provides signals to a display 30. The signal can also be provided to a video compressor 32, which thereby provides the information to a hard disk or to a network 34. In such a system, typically when the interlaced video signal is translated to a noninterlaced signal, there are artifacts that are created thereby due to motion of objects on the video signal. To more particularly describe this problem, refer now to FIG. 2, which describes more clearly how artifacts are created.

Figure 2:
FIG. 2 is a first embodiment of a frame of an interlaced field in accordance with the prior art.
Figure 2:
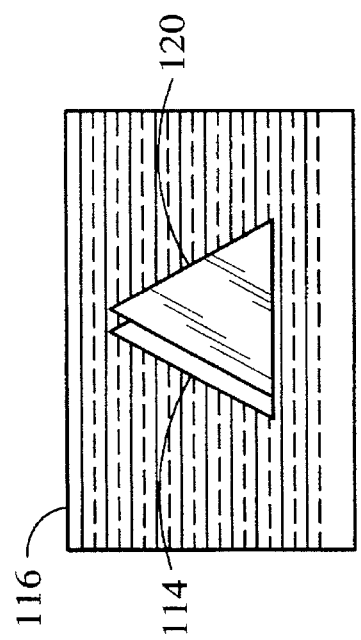

FIG. 2 is a first embodiment of a frame of an interlaced field in accordance with the prior art. In this embodiment, two video fields 110 and 112 are combined in the frame buffer from different time domains T0 and T1 and then displayed at domain T2 on the display. Since T2 has no constant relationship to T0 or T1, the object has moved across the screen between T0 and T1 causing a visible artifact 114 of object 120 at T2 on the noninterlaced display.

Figure 3:
FIG. 3 is a second embodiment of a frame of an interlaced field in accordance with the prior art.

FIG. 3 is a second embodiment of a frame of an interlaced field in accordance with the prior art. In this embodiment the even field and odd field 110' and 112' are obtained but not combined at time T2 (115). Thereafter, one of the fields is provided to the display and alternate lines are blanked, repeated or interpolated on the display.

The disadvantages of both of the schemes are alternate lines blanked scheme (black) in same location results in visually dull picture (picture with lower brightness) and black lines are quite visible. It is known that replication of each scan line lowers the vertical resolution. It is also known that to produce a good video frame through interpolation may require the use of extensive line buffer memory as well as a digital filter circuit, which adds to the cost and complexity of the system. Neither of the above-identified prior art systems truly emulates the display process on an interlaced screen.

Figure 4:
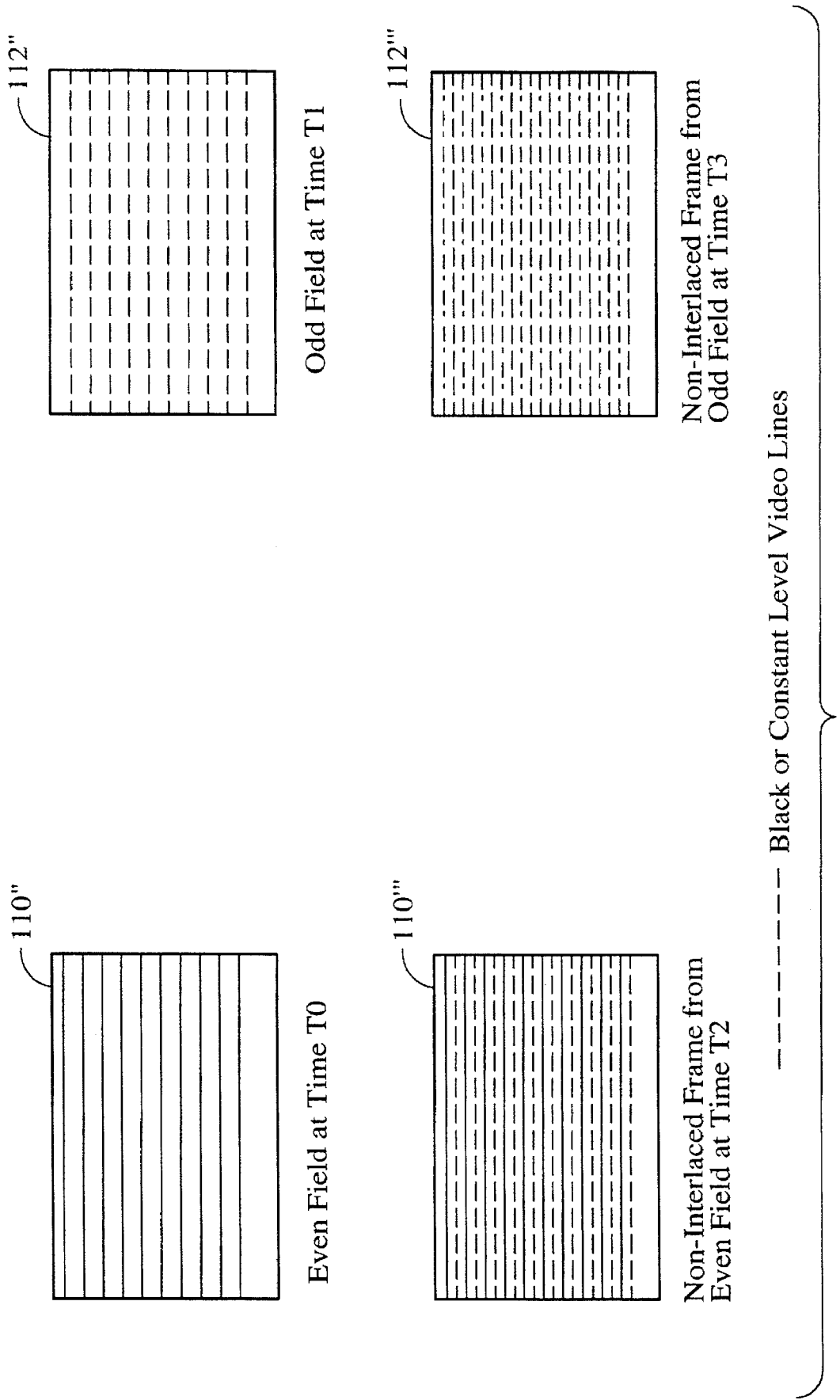
FIG. 4 is a diagram showing the displaying of an interlaced frame on a noninterlaced display in accordance with the present invention.

Referring now to FIG. 4, the even and odd fields 110" and 112" at time T0 and T1 respectively are alternately displayed as non-interlaced frames 110" and 112" at time T2 and T3 respectively on the noninterlaced screen. In this method and system motion video is displayed by a mechanism that emulates that of an interlaced display. An incoming field of interlaced video data is displayed on graphics monitor by displaying every other line constant signal level. A constant signal level could be a constant color or black dependent upon the user's needs. On each vertical sync of graphics display, location of video data and constant signal level line is shifted by one scan line to create the video frame as it is created on TV.

Preferably, the picture brightness and chroma saturation are automatically increased to compensate for the low persistent phosphor on a fine pitch display. This mechanism is usable for full screen interlaced video data display on non-interlaced monitor or display of interlaced video data in a freely scalable video window. Essentially, the circuit "converts" a noninterlaced computer monitor into an "interlaced" computer monitor. In addition a small region, rectangular or an arbitrary shape, can also be "converted" into "interlaced" display for displaying incoming interlaced video data on non-interlaced monitor without the "tearing" artifact.

Figure 5:
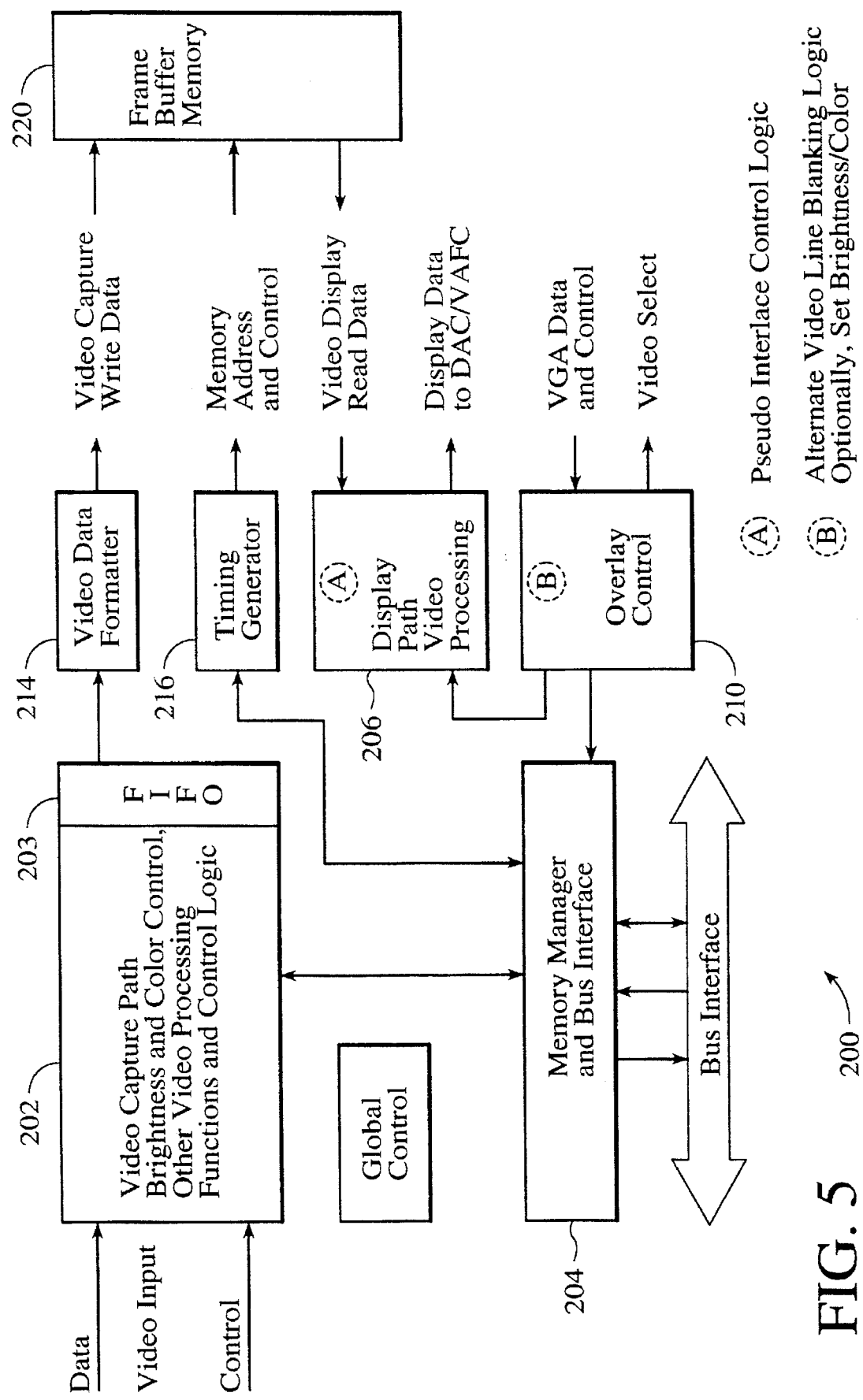
FIG. 5 is a block diagram of a system in accordance with the present invention for displaying the interlaced video frame on a noninterlaced display.

FIG. 5 is a block diagram of a system for providing the noninterlaced image in accordance with the present invention. The system 200 comprises a capture path video processing and controller 202 which includes a FIFO 203 which receives data and control signals related to the video signal. It is controlled by a memory manager and bus interface 204 which receives signals from a bus. The capture path video processing control 202 provides a video signal to the video data formatter 214. The memory manager in turn controls timing generator 208 and also receives signals from an overlay control circuit 210. The overlay control 210 also provides signals to a display path video processing system 206. The overlay control 210 receives display data and control signals along with outputting a memory select signal. The display path, video processing 206, memory timing generator 216, and video data formatter 214, respectively, provide memory signals and read/write data to a RAM 220. The following briefly describes the functionality of the important portions of the system 200.

Capture Path Video Processing and Controller 202

An Input Data Formatter accepts digital video inputs in one of the following formats and converts it into a common internal video data format suitable for processing by a video data processor.

The controller 202 accepts the timing signals switch as video HSync, VSync and HREF and performs the input ViewPort function. The input ViewPort function lets users define a rectangular Viewport for acquiring data inside it. Also the Controller generates the interlaced and noninterlaced X and Y memory addresses.

Two of the functions the system 200 performs are time base correction and frame rate conversion. Time base correction is achieved through capturing video data at the data rate it is coming from the video source device (decoder). Frame rate conversion is performed by reading out the incoming video data at display (typically VGA or NTSC/PAL) rate. These above two processes are required to capture and display full motion video, because input video source and display destination are not GenLocked (display data rate different than input video data rate or display timing and input video timing generated independently).

In a preferred embodiment, during video capture process, the controller 202 accepts a 16 bit YUV or RGB digital video stream at up to 30 frames or 60 fields per second via capture and video processing and control device 202. The input video frame can optionally be cropped before applying software selectable noise and aliasing reduction filters. Video data is further processed to increase or decrease the brightness to a user's liking. This processed input video stream is optionally scaled and stored in optimized, high performance frame buffer memory.

The overlay control 210 embodies a circuit that tracks pixel locations on a display raster using a timing signal such as display H.SYNC, display VSYNC and display CLOCK. It predetects the video window location and requests memory manager 204 to read out video data from frame buffer memory 220. The timing signal for frame buffer memory 220 access by timing generator 216.

Overlay Control 210

This module accepts the graphics display timing and manages the location and size of the video window on output display monitor. The window size and shape can be set using the X-Y window circuit and using Graphics Key Color (VGA Chroma Key) circuit and performing a logic function between the output of the two circuits.

The Graphics (VGA) Key Color circuit built into system 200 supports color keying for Hi-Color VGA modes running with Dual Edge scheme, Double Clock scheme, or Triple Clock schemes.

The Output Display Control logic performs the zoom and pan functions on video data inside Output ViewPort. The video data can be panned on a pixel boundary. Horizontal and Vertical Zoom are controlled independently.

Memory Manager and Bus Interface 204

The Memory Manager is responsible for managing all accesses to frame buffer memory 220 by all other modules and the system CPU. For video capture and display cycles memory manager treats the frame buffer as a pixel wide memory, while for CPU accesses it treats the frame buffer as byte wide memory.

The system 200 supports nonmultiplexed 8 and 16 bit bus interface for memory and register accesses. The memory attached to system 200 is I/O mapped and can be accessed as 8 bit byte or 16 bit word. Depending upon the interface to VGA subsystem, system 200 supports glueless interface to ISA bus. All register and memory resources are accessed through four consecutive I/O addresses; two for Index register and two for Data registers.

Display Path Video Processor 206

This functional block is responsible to read back the video data from the frame buffer memory 220 and process the data before the data is handed over for display.

The major components of Display Data Processor are described below.

1. Filter/Interpolater

This module can be programmed to perform a horizontal filter or interpolator function. When programmed as filter, it smoothes image to reduce aliasing caused by scaling. During zoom operation, this module is programmed to perform interpolation function. This function will compute and create new video data pixels as opposed to simple pixel replication. This results in reduced pixelization during zoom operation.

2. Color Space Converter

This high quality Color Space Converter accepts a YUV video data stream in common internal format and generates 16 to 21 bit RGB video data stream. The converted color component values are maintained between 0 and 255.

3. Display Formatter

This formatter accepts data from the Color Space Converter and Interpolator and outputs the data to the DAC in the required format. Some of the formats supported are 7:7:7 RGB, 6:6:6 RGB, 5:6:5 RGB, 1:5:5:5 GLSB, RGB, 16 bit YUV and 5:6:5 RGB on 8 bit bus in Hi-Color format. When RGB is output in a 8 bit format, the data is valid on each edge of the display clock. The display databus DD[7:0] can be directly hooked to the display feature connector for displaying video using video port on display board/chip.

The key portions of operation of the present invention rely to the overlay control 210 which provides a means for providing the frame as described in FIG. 4, as well as the display path video process 206 which provides the constant color video lines. The overlay control responsive to control signals from the monitor provide the means for moving the video signal by one scan line every frame period. The display path video processing unit 208 provides the line blanking signal that provides the constant color signal. In a preferred embodiment the brightness and color control is provided by the capture path and video processing block. However, in another embodiment the display path video processing could provide the brightness/color control.

Through the interaction of the overlay control and display path video processing, a pseudo interlaced image is provided to a noninterlaced graphics or VGA screen via a timing signal from the overlay control. The timing signal in the preferred embodiment is the vertical sync signal which is provided therefrom. To more particularly describe the operation of the present invention, particularly as it relates to these two elements, refer now to FIG. 6, which is a flow chart of the operation of the present invention.

Figure 6:
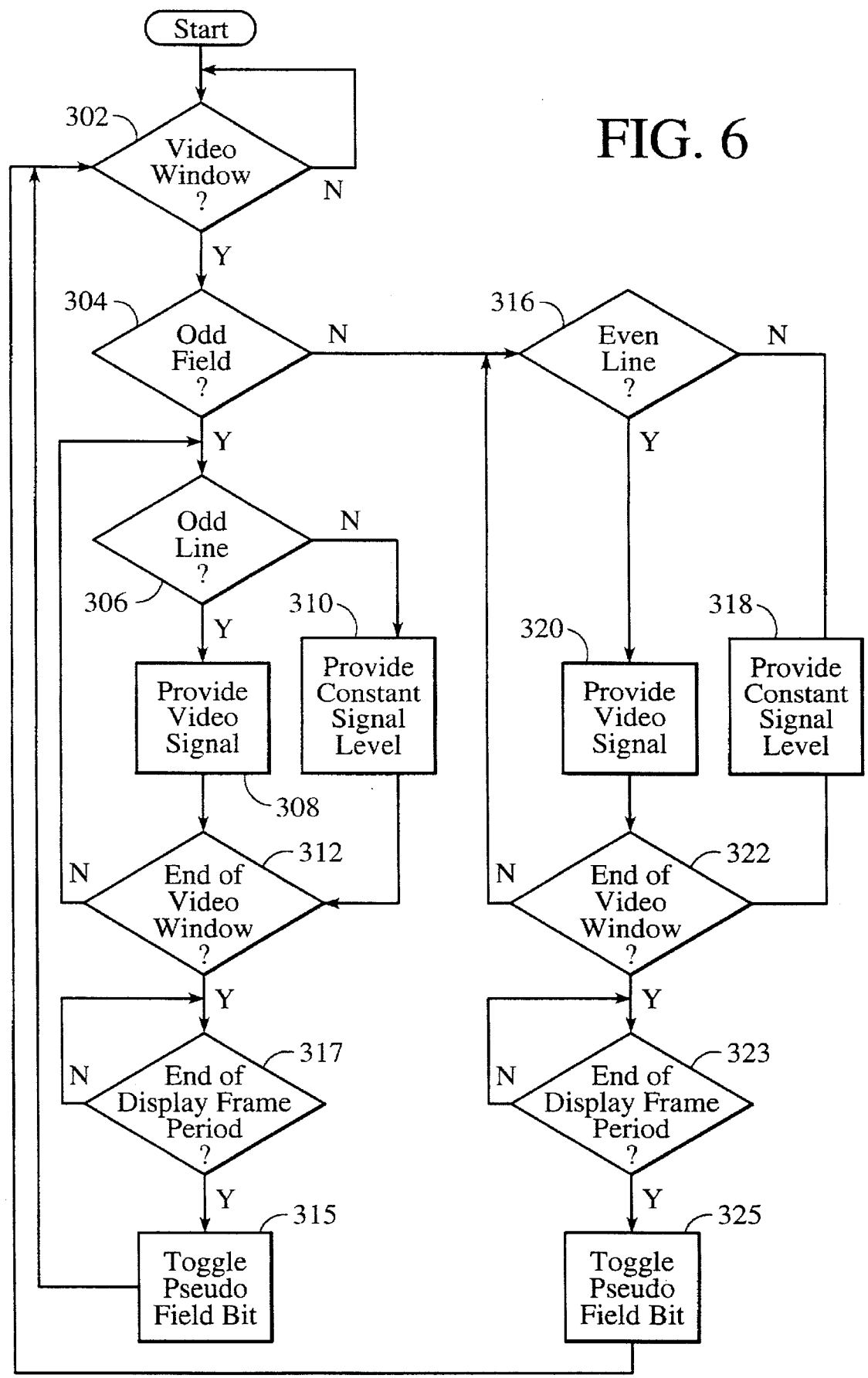
FIG. 6 is a flow chart showing the operation of the system in accordance with the present invention.

Referring now to FIG. 6, first it is determined whether a video window is on the display via step 302. If the video window is not on the display then return to the beginning. If the window is on the display, then the overlay control circuit determines whether a pseudo odd field is detected, via step 304. If the answer is yes, then it is determined whether it is an odd line of the field via step 306. If it is an odd line, then a video signal is provided, via step 308. If it is not an odd line, then a constant signal level is provided from the display path processor, via step 310. Either step 306 and 308 are repeated or 306 and 310 are repeated until the end of the video window period, via step 312. At the end of the window period, it is then determined if display frame period is over, via step 313 (which embodies the video window period), and thereafter the pseudo field signal is toggled via step 314, then return to the beginning and determine if a video window region has been reached, via step 302.

If the pseudo field signal indicates "even field" of the video window via step 304, then a determination is made whether it is an even line, via step 316. If it is not an even line, then a constant signal level is provided via step 318. If it is an even line, a video signal is provided via step 320. Steps 316 and 320 or steps 316 and 318 are repeated until the end of the video window period is reached, via step 322. Thereafter, at the end of the video window period, it is then determined if the display frame period, via step 323 and the pseudo field signal is toggled via step 325.

A key element is at the end of each display frame period, the overlay control provides a switching signal to then cause the pseudo field signal to be switched resulting in shifting up or down by one scan line the location where video data is displayed and location where constant level signal is displayed. In so doing, the signal displayed by the two fields to the eye looks like a pseudo interlaced image. Particularly at normal 60 Hz frequencies, the signal will look like a typical interlaced image on a TV monitor or the like without the artifacts showing therethrough.

In a preferred embodiment, the constant signal could be a blank signal provided from the display path controller. This constant signal could be varied to increase the brightness of the resultant image. In addition, in a preferred embodiment, a determinant could also be made of the size of the video window. If, for example, the video window height (period) was less than the (capture video field height) or any other predetermined size, then the system in accordance with the present invention could not be initiated.

Accordingly, a system and method in accordance with the present invention has the following benefits:

Eliminates "ghost" image artifact of displaying interlaced video on noninterlaced device;

Emulates video display process of interlaced TV on noninterlaced display device;

Video display region can be a small window or entire screen and of arbitrary shape;

Video display region can be occluded by other graphics objects of any shape or size;

Offers better picture quality than blanked line or replicated line techniques at lower cost;

By alternating (shifting) every other line at each frame period (V.Sync) with video field and black or constant level video signal, improves picture brightness and vertical resolution;

The picture quality is further improved by automatically increasing the picture brightness and color saturation of displayed video line to compensate for the low persistence—fine pitch, noninterlaced display.

Although the present invention has been described in accordance with the embodiments shown, one of ordinary skill in the art will recognize that there could be variations to the embodiment and those variations would be within the spirit and scope of the present invention. For example, a system and method in accordance with the present invention could be utilized when an interlaced display is utilized in a configuration where the input interlaced video image has no timing relationship with the display, such as a high definition video display. Accordingly, the present invention can be used in accordance with above identified teachings to remove the artifacts created thereby. Accordingly, many modifications may be made by one of ordinary skill without departing from the spirit and scope of the present invention, the scope of which is defined by the following claims.

What is claimed is:

1. A system for removing artifacts caused during display of an interlaced image with motion, the interlaced image comprising an odd and an even field, the system comprising:

means for providing one of the odd and the even fields on every other line of the display;

means for providing a set of constant signal level lines to the remaining lines of the display;

means responsive to a timing signal from the display for shifting the location of the constant level lines by a scan line; and means responsive to the shifting means for providing the other of the odd and the even field to the display.

2. The system of claim 1 in which the interlaced image comprises a video image.

3. The system of claim 1 in which the display comprises a computer graphics display.

4. The system of claim 1 in which the display comprises a high definition video display.

5. The system of claim 1 in which the display comprises a noninterlaced display.

6. The system of claim 1 in which the display comprises an interlaced display.

7. The system of claim 1 in which the timing signal comprises a vertical sync signal.

8. The system of claim 1 in which the timing signal comprises a horizontal sync signal.

9. The system of claim 1 in which the timing signal comprises a clock signal.

10. The system of claim 1 in which the set of constant signal level lines comprises a set of constant color lines.

11. The system of claim 1 in which the set of constant signal level lines comprises a set of black lines.

12. The system of claim 5 which further includes:

means for determining if a window of the image on the noninterlaced display is less than a predetermined size; and means responsive to the window determining means for stopping the system if the image is less than a predetermined size.

13. The system of claim 1 in which the set of constant signal level lines can be varied to increase the brightness of the image.

14. A method for removing artifacts caused during display of an interlaced image with motion, the interlaced image comprising an odd and an even field, the method comprising the steps of:

(a) providing one of the odd and the even fields on every other line of the display;

(b) providing a set of constant level lines to the remaining lines of the display;

(c) shifting the set of constant level lines by a scan line via a timing signal from the display;

(d) increasing the brightness and color levels of video picture; and (e) providing the other of the odd and the even fields to the display.

15. The method of claim 14 in which the interlaced image comprises a video image.

16. The method of claim 14 in which the display comprises a computer graphics display.

17. The method of claim 14 in which the display comprises a high definition video display.

18. The method of claim 14 in which the display comprises a noninterlaced display.

19. The method of claim 14 in which the display comprises an interlaced display.

20. The method of claim 14 in which the timing signal comprises a vertical sync signal.

21. The method of claim 14 in which the timing signal comprises a horizontal sync signal.

22. The method of claim 14 in which the timing signal comprises a clock signal.

23. The method of claim 14 in which the set of constant signal level lines comprises a set of constant color lines.

24. The method of claim 14 in which the set of constant signal level lines comprises a set of black lines.

25. The method of claim 18 in which step (a) further includes the steps of:

(a1) determining if a window of the image on the noninterlaced display is less than a predetermined size; and (a2) stopping the system if the image is less than a predetermined size.

26. The method of claim 14 in which the set of constant signal level lines can be varied to increase the brightness of the image.

* * * * *